United States Patent [19]
Ariyavisitakul et al.

[11] Patent Number: 5,946,351
[45] Date of Patent: Aug. 31, 1999

[54] TAP SELECTABLE DECISION FEEDBACK EQUALIZER

[75] Inventors: Sirikiat Ariyavisitakul; Nelson Ray Sollenberger, both of Tinton Falls, N.J.

[73] Assignee: AT&T Corporation, Middletown, N.J.

[21] Appl. No.: 08/777,335

[22] Filed: Dec. 27, 1996

[51] Int. Cl.$^6$ .............................. H03H 7/30; H03H 7/40; H03K 5/159
[52] U.S. Cl. ..................... 375/233; 375/348; 364/724.19
[58] Field of Search ................................ 375/229, 232, 375/233, 316, 324, 340, 346, 348; 364/724.19, 724.2

[56] References Cited

U.S. PATENT DOCUMENTS

| | | | |
|---|---|---|---|
| 5,119,196 | 6/1992 | Ayanoglu et al. | 358/167 |
| 5,245,561 | 9/1993 | Sugiyama | 364/724.19 |
| 5,475,710 | 12/1995 | Ishizu et al. | 375/232 |
| 5,483,557 | 1/1996 | Webb | 375/349 |
| 5,513,214 | 4/1996 | Gozzo | 375/232 |
| 5,777,910 | 7/1998 | Lu | 364/724.2 |

Primary Examiner—Chi H. Pham
Assistant Examiner—Bryan Webster

[57] ABSTRACT

A decision feedback equalizer receiver that assigns a number F of feedforward filter taps and optimizes digital receiver performance in multipath channel environments, where F is an integer less than a memory length of a radio channel. The feedforward filter taps are assigned to delay times corresponding to an optimum burst timing parameter delay time, d(0), and to F-1 time delays based on "tap SNR indices." For an Uncorrelated Inter-Symbol-Interference (UISI) case, the F-1 time delays are the first F-1 rank ordered time delays are selected as the feedforward tap delay times. For a general case, a combination of the UISI case and an analytical two cluster case is obtained by selecting the first F-2 rank ordered time delays and a 2D time delay, where D is the delay time corresponding to the largest estimated tap SNR index.

27 Claims, 3 Drawing Sheets

TAP SELECTABLE DECISION FEEDBACK EQUALIZER

1. Field of Invention

The invention relates to broadband wireless radio communication using a decision feedback equalizer receiver.

2. Background of the Invention

Devices such as cellular phones transmit signals carried by radio waves. The radio waves travel through the atmosphere and are reflected by various objects such as buildings resulting in multiple copies of the transmitted signals. The atmosphere and all the objects that affect the transmitted radio waves are called a radio channel. At any particular location, signals received by a receiver through the radio channel contains a combination of the multiple copies of the transmitted signals.

Some receivers incorporate a decision-feedback equalizer (DFE) that has a feedforward filter and a feedback filter to extract the transmitted signals from the received signals. The feedforward filter processes the received signals by combining multiple copies of the received signals together. Each copy of the received signals corresponds to a "tap" of the feedforward filter. The copy of the received signals corresponding to each tap is delayed in time by a "tap delay time," multiplied by a tap coefficient and the mulitplication results added together to form the feedforward filter output. In this way, the feedforward filter performs a cascade of noise-whitening filter, a matched filter, and a linear filter which mitigates a type of noise called precursor intersymbol interference (ISI). The feedback filter, on the other hand, uses past filtering decisions to cancel another type of noise called postcursor ISI.

For severe channel dispersion, the conventional feedforward filter requires a large number of feedforward filter taps and initial setting or training of tap coefficients is extremely difficult. Thus, there is a need for a low-complexity implementation that reduces a number of feedforward taps required to improve the performance and robustness of a DFE. The smaller number of feedforward filter taps also alleviate tap training difficulties.

SUMMARY OF THE INVENTION

This invention provides a decision feedback equalizer receiver apparatus and method for assigning a reduced number F of feedforward filter taps and corresponding tap delay times that optimizes digital receiver performance in multipath channel environments, where F is an integer less than a channel memory length. Because the radio channel is finite, the radio channel has a finite response (memory) to the transmitted signal. However, because the radio channel response to the transmitted signal is complicated by effects such as multipath propagation, the decision feedback equalizer receiver selects an optimum point, called the optimum burst timing parameter delay time d(0), in the received signals to begin extracting the transmitted signals. The feedforward filter taps are assigned corresponding to delay times of the optimum burst timing parameter delay time, d(0), and to additional F-1 time delays based on "tap SNR indices" that is defined and discussed below.

For an Uncorrelated Inter-Symbol-Interference (UISI) case (i.e. assuming that transmitted symbols do not interfere with each other in the received signal), the tap SNR index for a time delay is a ratio of an estimate of a main-cursor power over the sum of a precursor power of a signal plus noise power at the time delay. These tap SNR indices are determined for each time delay within the channel memory length and rank ordered in descending order. The first F-1 rank ordered time delays are selected as the F-1 feedforward tap delay times.

In a general case, a combination of the UISI case and a two cluster case, as shown in FIG. 5, is obtained by selecting the first F-2 rank ordered time delays and a 2D time delay, where D is the delay time corresponding to the largest estimated tap SNR index.

BRIEF DESCRIPTION OF THE DRAWINGS

The invention is described in detail with reference to the following drawings wherein like numerals represent like elements, and wherein.

DETAILED DESCRIPTION OF THE PREFERRED EMBODIMENTS

Radio waves are transmitted by a cellular phone or base station, for example, through the atmosphere or channel. The radio waves are reflected and scattered by surrounding buildings and terrain causing multipath propagation. Echoes occur due to the multipath propagation delays that disperse the transmitted signals. For applications such as cellular phones, the signals are transmitted using high-frequency carriers that have short wavelengths. As a user moves by about one-half a wavelength of the transmitted signals, the transmitted signals and the echoes of the transmitted signals can become 180° out of phase causing destructive interference. Such destructive interference results in multipath fading which causes the channel's impulse response to vary as a function of time.

For digital communications, data is transmitted in either isochronous (i.e., TDMA) or asynchronous packets called data packets. The number of information bits in each data packet (referred to as "packet length") may be varied from 400 to 4000 bits.

Figure 1:
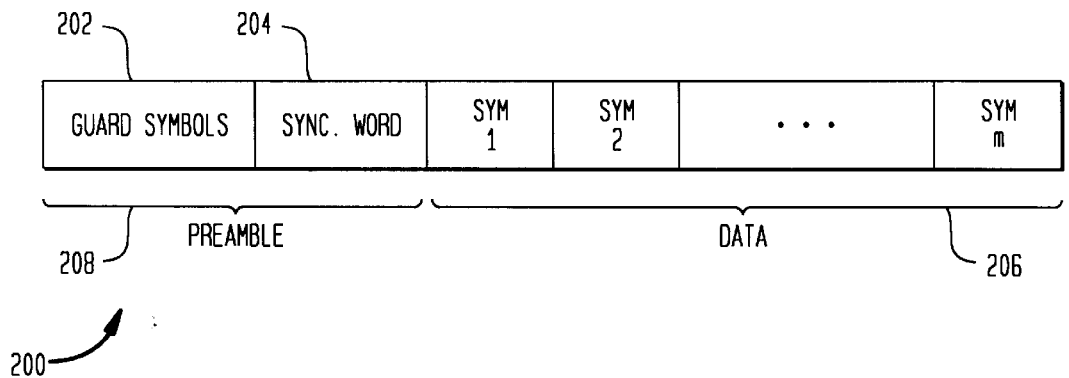
FIG. 1 is a diagram of a transmitted signal.

FIG. 1 shows an example of a transmitted data packet 200. The transmitted data packet 200 includes a preamble 208 and data 206. The transmitted data packet 200 is propagated through the channel and received by a receiver as a received signal. The received signal is a convolution of a channel impulse response and the transmitted data packet 200. Thus, the symbols of the data 206 are convolved with the impulse response of the channel which tends to spread the energy of each symbol with the energy of other symbols. Depending on when the receiver begins to decode the received signal, one symbol may undesirably affect reception of other symbols that were transmitted earlier and/or later in time.

A complex baseband representation of a received signal from the channel can be expressed as:

$$r_n(\tau) = \Sigma x_{n-k} h_k(\tau) + \eta_n, \text{ for } k \text{ equals } -K_1 \text{ to } K_2. \quad (1)$$

$r_n(\tau)$ is the received signal sampled at time $nT+\tau$, where $T$ is the symbol period, and $\tau$ is the symbol timing phase; $x_n$ is the nth transmitted data symbol ($x_n = \pm 1 \pm j$ for Quadrature Phase Shift Keying (QPSK) for example); $\eta_n$ is the nth sample of additive white Gaussian noise with single-sided power density of $N_o$; and $h_k(\tau) = h(kT+\tau)$ is the kth sample of the (instantaneous) channel impulse response $h(t)$. Assuming that the channel has a finite response, then $h_k(\tau)=0$ for $-K_1 < k < K_2$. The total memory length K of the channel is $K=K_1+K_2$.

Figure 2:
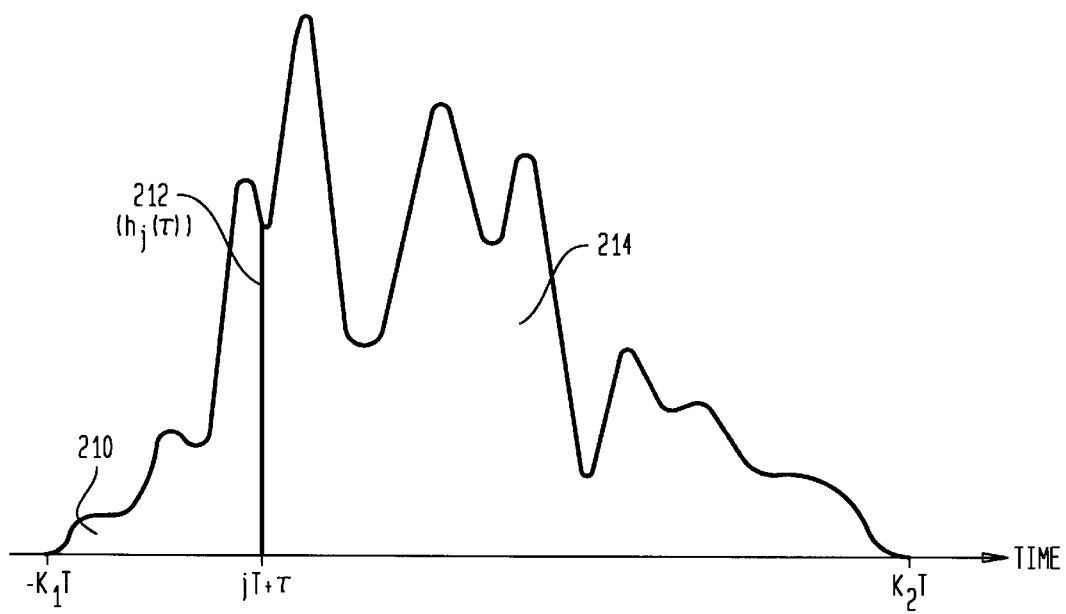
FIG. 2 is a representation of a channel impulse response.

FIG. 2 shows a representation of the channel impulse response h(t). The graph represents the received energy over time. Because the channel is assumed to have a finite energy, the received signal for each symbol is zero outside a channel memory or channel length. As shown in FIG. 2, the channel length, in units of symbol period T, is between $-K_1$ and $K_2$. Thus, the channel length is $K_1+K_2$. Assuming $h_j(t)$ to be a main cursor where j is a timing parameter, the energy between $-K_1T$ and $jT+t$ is called precursor 210 and the energy between T and $K_2T$ is called postcursor.

The symbol energy is not shown starting at time 0 because the exact time selected by a digital receiver to begin decoding the received signal is based on optimizing various parameters or figures of merit such as a signal-to-noise ratio. Thus, the portion of the received signal used to extract the transmitted symbol may not start at time 0. Since symbols are transmitted consecutively, the precursor 210 and postcursor 214 associated with each symbol become intersymbol interference (ISI) when detecting other symbols.

Figure 3:
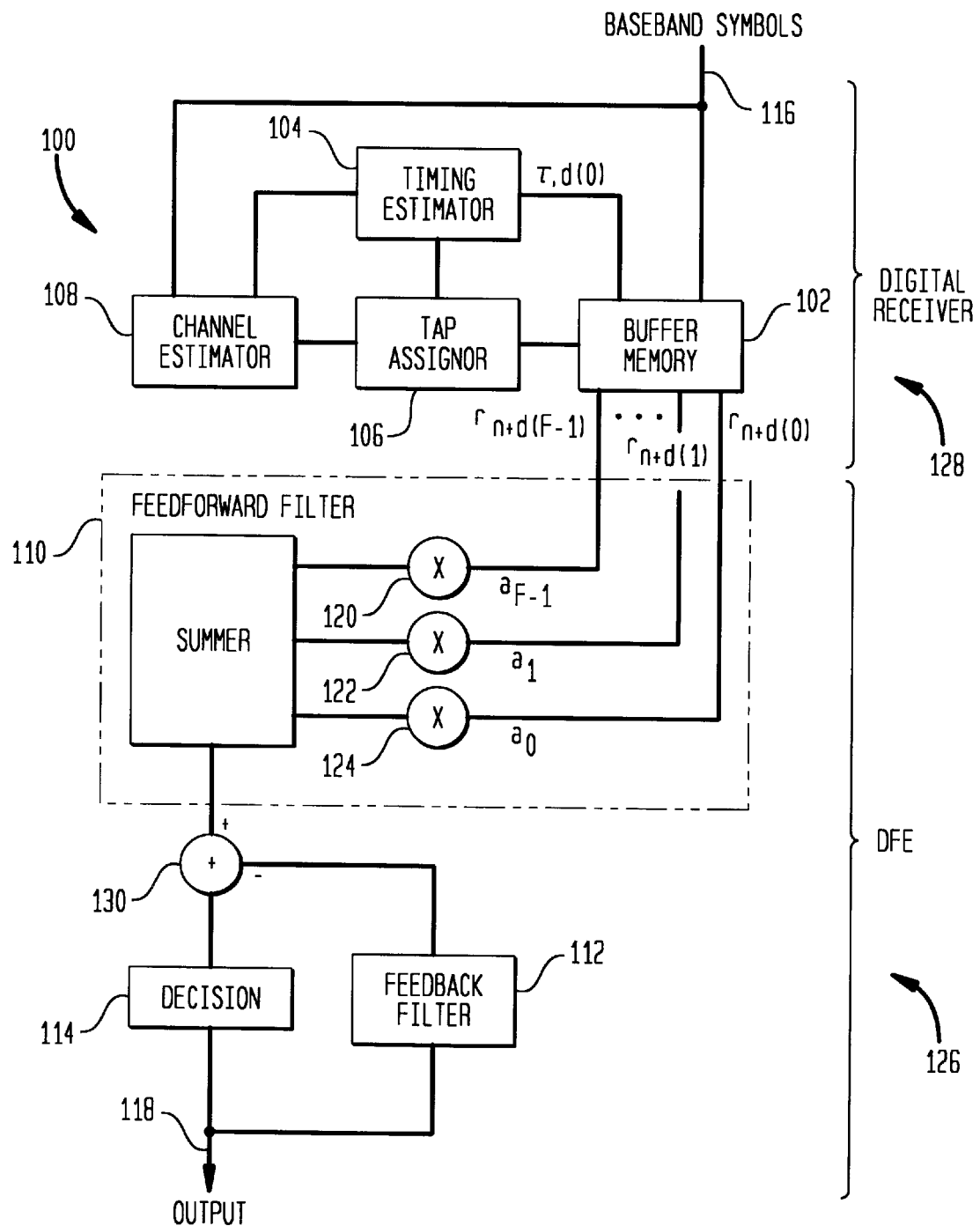
FIG. 3 is a diagram of a digital receiver.

FIG. 3 shows a decision feedback equalizer (DFE) receiver 100 that includes a digital receiver 128 and a DFE 126. The digital receiver 128 receives inphase I and quadrature Q baseband signals from a receiver front-end (not shown) which is coupled to an antenna (also not shown). The receiver front-end includes the apparatus necessary to receive the transmitted radio-frequency signal and to convert the radio-frequency signal into I and Q baseband signals. The I and Q baseband signals are oversampled and quantized into digital values by the receiver front-end. For example, for 4:1 oversampling, four samples are obtained for each symbol corresponding to $\tau_1$, $\tau_2$, $\tau_3$ and $\tau_4$ symbol timing phases. Only one of the symbol timing phases ($\tau_1$, $\tau_2$, $\tau_3$ and $\tau_4$) is selected by the digital receiver 128 for each received data packet.

The digital receiver 128 includes a buffer memory 102, a channel estimator 108, a timing estimator 104, and a tap assignor 106. The buffer memory 102 stores the digitized oversampled signal of the received data packet while necessary estimation processes are performed by the channel estimator 108, the timing estimator 104 and the tap assignor 106.

The channel estimator 108 may estimate the channel impulse response by using a correlation method to correlate the received signal with a known signal, for example. As shown in FIG. 1, the preamble 208 includes guard symbols 202 and a sync word 204. The sync word 204 is a preestablished sequence of patterns. Thus, when the sync word 204 is received through the signal bus 116, the channel estimator 108 may estimate the channel impulse response by correlating the received sync word with the preestablished sync word 204.

The timing estimator 104 determines the optimum burst timing parameter as a delay value d(0) relative to $-K_1$ and an optimum symbol timing parameter $\tau$ based on the channel impulse response generated by the channel estimator 108. d(0) is the number of symbol units indicating an optimum delay time between a "normal" burst arrival timing and a timing of the first symbol at a first feedforward tap and $\tau$ is the symbol timing phase to be used for estimating all the symbols. $\tau$ and d(0) are also input into the tap assignor 106 for selection of feedforward filter taps.

Because the actual received signal is the transmitted data packet 200 convolved with the impulse response of the channel, the output of the channel estimator 108 is especially useful for generating figures of merits such as signal-to-intersymbol interference-plus-noise ratio (SINR) indices for determining the optimum portion of the received signal to use for extracting the transmitted symbols. For example, to determine the optimum burst timing d(0) and symbol timing $\tau$, the timing estimator may select, among all possible timing parameters, the burst timing d(0)=j and the symbol timing $\tau$ that maximizes a following SINR index:

$$\gamma = \frac{|h_j(\tau)|^2}{\sum |h_k(\tau)|^2 + 2N_0} \quad (2)$$

for k between $-K_1$ and j where j is a first timing parameter. The numerator is an estimated power of the main-cursor 212 while the left hand term of the denominator is an estimated power of the precursor 210. $h_k(\tau)$ is an estimate of the kth sample of the impulse response and may be generated by the channel estimator 108.

Conventionally, the feedforward filter taps are "taps" on a continuous delay line, where the taps are separated from each other by one symbol period T. The received signal is input to the delay line and the d(0) tap is the first tap farthest from the delay line input and d(1) is the next tap delayed from the d(0) tap by T and so on extending across the total channel memory length. With severe channel dispersion, the number of taps must increase correspondingly and the setting and training of coefficients associated with these many taps becomes very difficult.

This invention provides a method and apparatus for selecting a number of feedforward taps that is less than required by conventional receivers and yet maintains high performance. The feedforward taps may also be variably selected so that the DFE receiver 100 is less sensitive to changing channel conditions caused by movement of the cellular phone, for example.

Based on the outputs of the timing estimator 104 and the tap assignor 106, samples of the baseband signals stored in the buffer memory 102 are selected for output to a feedforward filter 110 of the DFE 126. The feedforward filter 110 receives the baseband signals from the buffer memory 102 based on the tap delays assigned by the tap assignor 106.

As shown in FIG. 3, the filter 110 has a total of F taps having corresponding tap delays. The baseband signals received from each feedforward filter tap is multiplied by a respective coefficient ($a_0, a_1 \ldots a_{F-1}$) by multipliers 124, 122 and 120. The output of the multipliers 124, 122 and 120 are input into a summer and the output of the summer is input to a back-end of the DFE 126 which includes an adder 130, a decision unit 114 and a feedback filter 112. The output of the DFE 126 is connected to other processing units through the output signal bus 118.

The feedforward filter coefficients ($a_0, a_1 \ldots a_{F-1}$) and the feedback filter coefficients are adjusted based on a minimum mean-square error (MMSE) criterion, for example. Adjusting the feedforward and feedback filter coefficients requires training with known symbols to solve coefficient equations through adaptive algorithms, such as a least mean-square (LMS) algorithm or a recursive least square (RLS) algorithm. This training is performed by using information such as the preamble information discussed earlier.

As indicated above, conventional digital receivers require a large number of filter taps to handle severe channel dispersion caused by the multipath propagation phenomena. This invention provides for a low-complexity method and apparatus that uses a small number of feedforward taps to capture the energy of a radio wave in multipath propagation environments. In particular, a preferred embodiment selects F feedforward filter taps based on a signal-to-noise (SNR) index as discussed below.

If it is assumed that the precursor ISI is uncorrelated between different feedforward taps and the postcursor ISI is completely cancelled by the feedback filter 112, then a simple tap assignment scheme can be derived. While the above uncorrelated ISI assumption is not always true, the resulting tap assignment scheme proves to be useful.

The output SNR $\gamma_1$ of a MMSE-DFE with the above assumption is as follows:

$$\gamma_1 = \sum_{q=0}^{F-1} \frac{|h_{d(q)}|^2}{G_{d(q)}}, \quad (3)$$

where: $h_{d(q)} = h_{d(q)}(\tau)$ is an estimate of the channel impulse response at delay d(q). Thus, $|h_{d(q)}|^2$ is an estimate of the main-cursor power of the signal at tap delay d(q).

$$G_{d(g)} = \sum_{k=K_1}^{d(q)-1} |h_k|^2 + 2N_o \quad (4)$$

is the sum of the precursor power of the signal at tap delay d(q) plus the noise power. If postcursor ISI is not completely cancelled by the feedback filter 112, $G_{d(q)}$, may include the residual postcursor ISI power. An estimate of the main-cursor power of the signal at tap delay d(q) is $$|h_{d(q)}|^2.$$

Thus, $$|h_{d(q)}|^2 / G_{d(q)}$$

can be viewed as the "tap SNR index" of the signal at tap delay d(q).

Equation (3) is the sum of all tap SNR estimates. This indicates that, when the ISI is uncorrelated, the DFE performs maximal-ratio combining of the signals in all the feedforward taps. Each feedforward tap performs the role of capturing multipath energy, while subjected to precursor ISI.

Equation (2) holds regardless of how the taps are assigned. Thus, given that the total number of feedforward taps F is smaller than the memory length of the channel, the tap SNR index can be maximized by selecting the taps such that the sum of their tap SNR estimates is the largest. A method for optimally assigning taps in this case may be:

(i) Compute the tap SNR estimate $$|h_k|^2 / G_k$$

(using the estimates of the channel impulse response at the estimated symbol and burst timing) for all time delays k within the is expected memory length of the channel;

(ii) Select the F-1 time delays whose computed values of the tap SNR estimates are the largest as tap delay times; and (iii) Assign feedforward taps to the selected F-1 tap delay times.

The above method maximizes the tap SNR index if the precursor ISI is uncorrelated. When the precursor ISI is correlated, the DFE will take advantage of the correlation and use it to mitigate the ISI. Thus, the actual output SNR of the DFE is always better than that obtained in the uncorrelated ISI case. Thus, the output SNR in equation (2) is a lower-bound performance of a non-contiguous MMSE-DFE. In the correlated ISI case, the optimum tap assignment becomes very complicated even when the number of feedforward taps is small.

Figure 4:
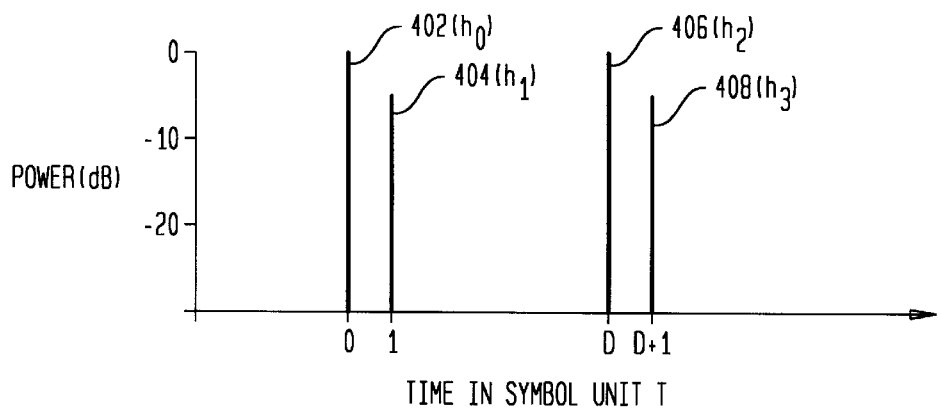
FIG. 4 is a representation of a 2-cluster multipath channel.

For a 2-cluster profile as shown in FIG. 4, each cluster includes signals of 2 T-spaced paths (402, 404) and (406, 408), with average powers of 0 dB and −6 dB, for example. The separation between the two clusters is denoted by D, where D ≧ 3.

A table below shows tap assignments for the two cluster profile of FIG. 4. Assuming a fixed burst timing d(0)=0, the second column lists the explicit expression of the output SNR for each assignment, wherein $h_0$, $h_1$, $h_2$, and $h_3$ are the complex amplitudes of the 4 paths of FIG. 4. The probability (over Rayleigh fading) that each assignment gives the best tap SNR index for a given instantaneous realization of the fading channel is computed and this is shown in the third column. The tap assignments are listed in descending order of the computed value of this probability. An average input SNR of 30 dB is assumed.

TABLE

Tap Assignments for the 2-Cluster Profile in FIG. 4

| Tap Assignment [d(0), d(1), d(2)] | Output SNR | Probability of Being the Best Assignment |
|---|---|---|
| (a) [0,D,2D] | $\frac{\|h_0\|^2}{2N_0} + \frac{(\|h_2\|^2 G_4)}{(G_2 G_4 - \|h_0^* h_2 + h_1^* h_3\|^2)}$ | 0.4134 |
| (b) [0,1,2] | $\frac{\|h_0\|^2}{2N_0} + \frac{\|h_1\|^2 G_2}{G_1 G_2 - \|h_0\|^2 \|h_1\|^2}$ | 0.1676 |
| (c) [0,1,D + 1] | $\frac{\|h_0\|^2}{2N_0} + \frac{\|h_1\|^2 G_3 + \|h_3\|^2 G_1 - 2\mathrm{Re}[h_0 h_1^* h_2^* h_3^*]}{G_1 G_3 - \|h_0\|^2 \|h_2\|^2}$ | 0.1660 |

TABLE-continued

Tap Assignments for the 2-Cluster Profile in FIG. 4

| Tap Assignment [d(0), d(1), d(2)] | Output SNR | Probability of Being the Best Assignment |
|---|---|---|
| (d) [0,1,D] | $\dfrac{|h_0|^2}{2N_0} + \dfrac{|h_1|^2}{G_1} + \dfrac{|h_2|^2}{G_2}$ | 0.1121 |
| (e) [0,D,D + 1] | $\dfrac{|h_0|^2}{2N_0} + \dfrac{|h_2|^2 G_3 + |h_3|^2 G_2 - 2\mathrm{Re}[h_0 h_1^* h_2^* h_3^*]}{G_2 G_3 - |h_0|^2 |h_1|^2}$ | 0.1029 |
| (f) [0,D,2D − 1] | $\dfrac{|h_0|^2}{2N_0} + \dfrac{|h_2|^2 G_4}{G_2 G_4 - |h_1|^2 |h_2|^2}$ | 0.0186 |
| (g) [0,D + 1,2(D + 1)] | $\dfrac{|h_0|^2}{2N_0} + \dfrac{|h_3|^2 G_4}{G_3 G_4 - |h_0|^2 |h_3|^2}$ | 0.0151 |
| (h) [0,D + 1,2D + 1] | $\dfrac{|h_0|^2}{2N_0} + \dfrac{(|h_3|^3 G_4)}{(G_3 G_4 - |h_0^* h_2 + h_1^* h_3|^3)}$ | 0.0020 |
| (i) [0,D,2D + 1] | $\dfrac{|h_0|^2}{2N_0} + \dfrac{|h_2|^2 G_4}{G_2 G_4 - |h_0|^2 |h_3|^2}$ | 0.0019 |
| (j) [0,1,D + 2] | $\dfrac{|h_0|^2}{2N_0} + \dfrac{|h_1|^2 G_4}{G_1 G_4 - |h_0|^2 |h_3|^2}$ | 0.0004 |

A contiguous tap assignment (Assignment (b)) in the Table is the best assignment for only about 17% of the time. A non-contiguous tap assignment: (0, D, 2D) performs significantly better. This assignment is structured to capture the energy of the first and the third paths, which are the dominant paths for this profile, while using the last tap (assigned to a nonexistent path) to mitigate the precursor ISI caused by the first path to the signal in the second tap.

Figure 5:
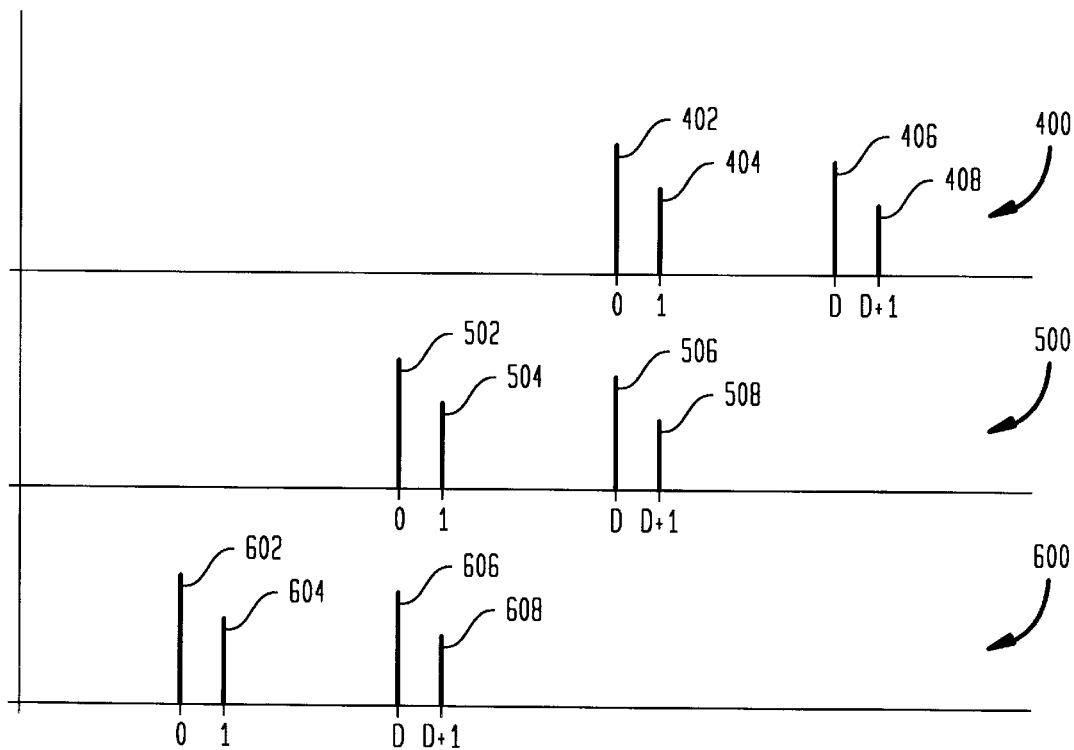
FIG. 5 is a representation of received input signals at tap time delays 0, D and 2D of the 2-cluster multipath channel of FIG. 4.

As shown in FIG. 5, the signals received by tap delay 0 is shown in diagram 400; the signals received by tap delay D is shown in diagram 500 and the signal received by tap delay 2D is shown in diagram 600. The main-cursor power of the receive symbol 402 at tap delay 0 is combined with the main-cursor power of the received signal 506 at tap delay D. The signal received at tap delay D also includes precursor ISI caused by the precursor 502 and 504. This precursor ISI may be mitigated by the signal received at tap delay 2D 606 and 608. Thus, the non-contiguous tap assignment (0, D, 2D) mitigates the precursor ISI caused by the first path to the signal in the second tap.

The above two cluster profile is an example of a special case of small number of paths and taps. However, in general, simulation results show that if the uncorrelated ISI (UISI) case is combined with the two cluster profile concept (0, D, 2D), good performance can be obtained. An example of such a method may be as follows:

(i) Compute the tap SNR estimate $|h_k|^2/G_k$ for all time delays k within the expected memory length of the channel;

(ii) Rank order the time delays in descending order of tap SNR estimates of step (i);

(iii) Select the F-2 time delays whose computed values of the tap SNR estimates are the largest as the first F-2 tap delay times after the tap delay time d(0); and (iv) Select 2D time delay as the (F-1)th tap delay time, where D is the delay time corresponding to the largest computed value of the tap SNR estimates; and (v) Assign feedforward taps to the selected F-1 tap delay times.

While this invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention as defined in the following claims.

What is claimed is:

1. A decision feedback equalizer receiver, comprising:
a channel estimator that estimates a response of a channel;
a feedforward filter having a plurality of taps; and
a tap assignor coupled to the channel estimator, wherein based on an output of the channel estimator, the tap assignor selects one of a plurality of tap delays to correspond to each of the taps of the feedforward filter.

2. The decision feedback equalizer receiver of claim 1, wherein the channel estimator estimates the channel based on a preamble of a received input signal.

3. The decision feedback equalizer receiver of claim 2, wherein the channel estimator generates an estimated impulse response of the channel.

4. The decision feedback equalizer receiver of claim 1, wherein the decision feedback equalizer receiver receives input signals in packets and the tap assignor independently selects the tap delays for each of the packets.

5. The decision feedback equalizer receiver of claim 1, wherein the feedforward filter multiplies a received input signal by coefficients based on selected tap delays and sums multiplication results to generate a feedforward filter output, each of the coefficients corresponding to one of the taps.

6. The decision feedback equalizer receiver of claim 1, wherein a number of selected tap delays is less than a channel width in symbol units.

7. The decision feedback equalizer receiver of claim 1, wherein the tap assignor selects the tap delays based on a plurality of signal-to-noise ratio indices, each of the signal-to-noise ratio indices being a ratio of a main-cursor power of a received input signal at a tap delay and an inter-symbol-interference power of the received input signal at the tap delay.

8. The decision feedback equalizer receiver of claim 7, wherein each of the signal-to-noise ratio indices corresponds to one of the selected tap delays.

9. The decision feedback equalizer receiver of claim 7, wherein the main-cursor power of the received input signal at a tap delay d(q) is $|h_{d(q)}|^2$, where $h_{d(q)}$ is a complex amplitude of an estimated impulse response of the channel at a time delay d(q).

10. The decision feedback equalizer receiver of claim 7, wherein the inter-symbol-interference power of the received input signal at a tap delay d(q) is:

$$\sum_{k=-K_1,}^{d(q)-1} |h_k|^2 + 2N_o$$

where $-K_1$ is a beginning of an estimated impulse response of the channel, $h_k$ is a complex amplitude of an estimated impulse response of the channel at a time delay k, and $N_0$ is an estimated noise power.

11. The decision feedback equalizer receiver of claim 7, wherein F-1 time delays having largest tap signal-to-noise ratio indices are selected as the tap delays of the feedforward filter, where F is an integer greater than 1 and less than a channel width of the channel in symbol units.

12. The decision feedback equalizer receiver of claim 7, wherein the feedforward filter has three tap delays, and a time delay having a largest tap signal-to-noise ratio index is selected, and two of the three tap delays are assigned to the time delay and twice the time delay.

13. The decision feedback equalizer receiver of claim 7, wherein F-2 time delays having largest tap signal-to-noise ratio indices are selected as the tap delays of the feedforward filter and a time delay 2D is selected as an additional tap delay, where F is an integer greater than 2 and less than a channel width of the channel in symbol units, and D is a time delay having a largest tap signal-to-noise ratio index.

14. A method for operating a decision feedback equalizer receiver, comprising:
    estimating a response of a channel; and
    selecting one of a plurality of tap delays based on the estimated response of the channel to correspond to each of a plurality of taps of a feedforward filter.

15. The method of claim 14, wherein the estimating step estimates the channel based on a preamble of a received input signal.

16. The method of claim 14, wherein the estimating step generates an estimated impulse response of the channel.

17. The method of claim 14, further comprising:
    receiving input signals in packets, wherein the tap delays are independently selected for each of the packets.

18. The method of claim 14, further comprising:
    multiplying a received input signal by coefficients based on the selected tap delays; and
    summing the multiplication results to generate a feedforward filter output, each of the coefficients corresponding to one of the taps.

19. The method of claim 14, wherein a number of selected tap delays is less than a channel width in symbol units.

20. The method of claim 14, wherein the selecting step selects the tap delays based on a plurality of signal-to-noise ratio indices, each of the signal-to-noise ratio indices being a ratio of a main-cursor power of a received input signal at a tap delay and an inter-symbol-interference power of the received input signal of the tap delay.

21. The method of claim 20, wherein each of the signal-to-noise ratio indices corresponds to one of the selected tap delays.

22. The method of claim 20, wherein the main-cursor power of the received input signal at a tap delay d(q) is $|h_{d(q)}|^2$, where $h_{d(q)}$ is a complex amplitude of an estimated impulse response of the channel at a time delay d(q).

23. The method of claim 20, wherein the inter-symbol-interference power of the received input signal at a tap delay d(q) is:

$$\sum_{k=-K_1,}^{d(q)-1} |h_k|^2 + 2N_o,$$

where $-K_1$ is a beginning of an estimated impulse response of the channel, $h_k$ is a complex amplitude of an estimated impulse response of the channel at a time delay k, and $N_0$ is an estimated noise power.

24. The method of claim 20, wherein the selecting step selects F-1 time delays having largest tap signal-to-noise ratio indices to correspond to the tap delays of the feedforward filter, where F is an integer greater than 1 and less than a channel width of the channel in symbol units.

25. The method of claim 14, wherein the feedforward filter has three taps and the selecting step selects a first time delay having a largest tap signal-to-noise ratio index and a second time delay being twice the first time delay to correspond to two of the three taps of the feedforward filter.

26. The method of claim 14, wherein the selecting step selects F-2 time delays having largest tap signal-to-noise ratio indices and a last time delay of 2D to correspond to the tap delays of the feedforward filter, where F is an integer greater than 2 and less than a channel width of the channel in symbol units, and D is a time delay having a largest tap signal-to-noise ratio index.

27. The method of claim 14, wherein a tap assignor selects the tap delays based on a plurality of signal-to-noise ratio indices, each of the signal-to-noise ratio indices being a ratio of a main-cursor power of a received input signal at a tap delay and an inter-symbol-interference power of the received input signal at the tap delay.

* * * * *